June 25, 1946. E. WINER 2,402,717
PLASTIC FRAMED LAMINATED PANEL AND METHOD
Filed Sept. 15, 1942
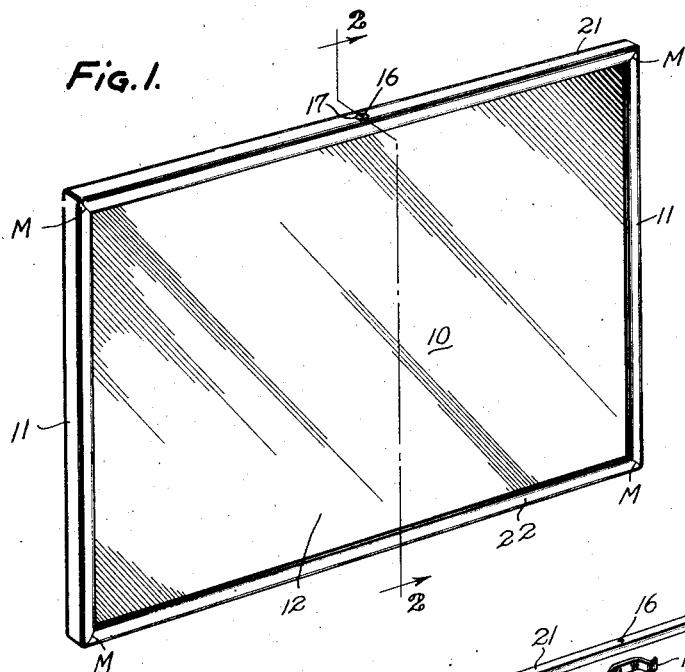
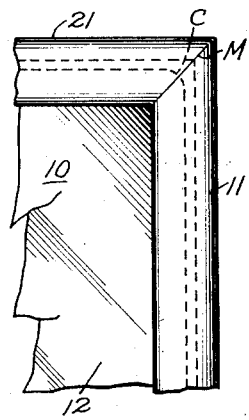
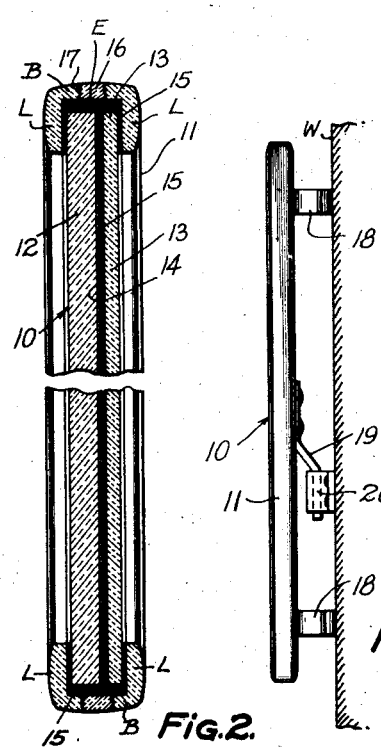
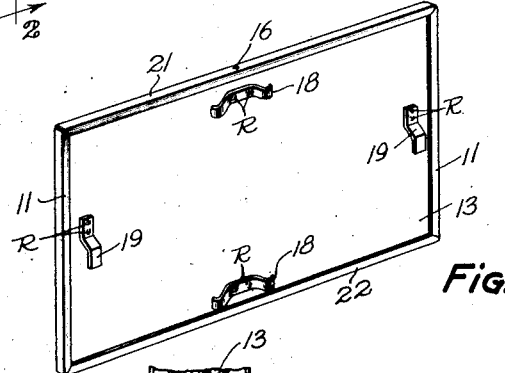
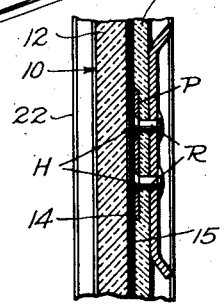
Inventor
EPHRAIM WINER,
By KARL W. FLOCKS
Attorney Patented June 25, 1946

2,402,717

UNITED STATES PATENT OFFICE 2,402,717

PLASTIC FRAMED LAMINATED PANEL AND METHOD

Ephraim Winer, Baltimore, Md., assignor to The National Plastic Products Company, Odenton, Md., a corporation of Maryland Application September 15, 1942, Serial No. 458,477

8 Claims. (Cl. 18—59)

This invention relates to framed panels and the method of making same, and more particularly to laminated panels such as backed up glass mirrors protected and sealed along their perimeters or margins with channel-like frame means which may comprise an extruded plastic.

Prior to the instant invention it has been customary to mount mirrors in frames in a manner similar to the framing of a picture. When such conventional framing is desired, the frame section is generally L-shaped, so that one leg of the L covers the face of the mirror, and the other leg of the L covers the edge of the mirror. A backing such as wood may then generally be placed loosely on the back of the mirror and within the leg of the frame which covers the edge of the mirror. If the frame is of wood nails may be partially driven into the frame to hold the wood backing in place thereby holding the mirror within the frame in the generally accepted manner that a picture is held within a frame. Such mountings may be acceptable for some uses such as, for example, where a purely decorative effect is desired.

If such a conventionally mounted mirror is to have lasting qualities, great care must be taken with the back or mirrored surface of the glass. It has been customary, for example, to plate the mirrored surface of the glass with copper to protect the mirrored surface. This plating step increases the cost of the mirror and while it affords some additional protection under static conditions, it has been found to be unsatisfactory for many uses unless additional protective means are utilized. Such prior mirrors are generally unsatisfactory for use in bathrooms, for example, because the edges are unsealed permitting the entrance of dirt, steam, condensation and moisture. Furthermore, if the mirror forms a door to a cabinet this prior construction is unsatisfactory because conditions are not static and the mirror must resist shock. If, under dynamic conditions, copper plating is injured, the mirror will soon be ruined. If the copper begins to peel away at the edges because of improper sealing at the edges, the protection originally afforded by the copper plating will soon be lost.

If the use of the mirror is such that it be essential that it be highly resistant to shock, the mirror may be made of specially heat treated glass. This glass is, however, expensive. The front portion of the edge of a glass mirror may be beveled in order to afford some protection to the edge in an endeavor to eliminate a frame. The beveling of glass is, however, expensive and while the mirror may be an unbeveled and unframed mirror, a mirror which has no protection at the edges but a bevel leaves much to be desired because of an unsanitary edge where the mirror forming film contacts the rear surface of the glass. Once the mirror forming film begins to peel because of the entrance of dirt between the film and the glass, the mirror becomes unsightly and generally unsatisfactory for the purpose for which it was intended.

It is an object of the instant invention to teach a novel and inexpensive method of fabricating a framed panel such as a mirror with hermetically sealed edges, which will be highly resistant to shock and sanitary.

It is another object of the invention to teach a laminated frame mirror construction which will be highly resistant to salt spray, sanitary, and resistant to shock.

It is a further object of the instant invention to teach the construction of a mirror with a hermetically sealed edge and mirror forming film.

It is still a further object of the invention to teach the construction of a framed shatter-proof laminated panel involving a sanitary hermetically sealed edge.

Other objects and the nature and advantages of the invention will be apparent from the following description taken in conjunction with the accompanying drawing, wherein:

Figure 1 is a view in perspective of a framed mirror in accordance with the invention showing the face of the mirror;

Fig. 1a is a fragmentary detail of the corner construction of the mirror shown in Fig. 1;

Fig. 2 is a section taken along line 2—2 of Fig. 1 looking in the direction of the arrows;

Fig. 3 is a view similar to Figure 1 showing the rear side of the framed mirror;

Fig. 4 is a sectional detail showing the mirror resiliently mounted on a stationary wall; and Fig. 5 is a sectional detail of a modification.

Referring to Figures 1-4, inclusive, the mirror panel 10 is framed by an extruded plastic 11 of substantially channel section, as best shown in Figure 2. The channel section comprises a base B and two legs L. The mirror panel 10 comprises a glass lamina 12, a backing lamina 13 which may be tempered lignin plastic material known as Masonite to the trade, a mirror forming film 14 and a sealing mastic cement 15. The same mastic cement 15 that extends between the mirror forming film 14 and the backing 13 may also extend between the inner side of the base B and the edge E of the mirror panel, between the inner side of the legs L and the exterior base of the glass and the rear side or surface of the backing 13.

For example, a mirror in accordance with the invention may utilize a channel frame having a distance between the inside of each leg L of approximately 3/8" or slightly more and a glass lamina thickness of approximately 1/4" or slightly less. The backing thickness may be approximately 1/8". The mirror forming film 14 may be conventional in character such as precipitated metallic silver. The thickness of the mastic cement overlying the film 14 will, of course, be much greater in dimension than the thickness of the mirror forming film but it is to be of less dimension than the thickness of the cement mastic between the edge E of the mirror panel and the inner side of the base B of the channel frame 11. The thickness of the cement mastic between the inner side of the legs L of the channel frame 11 and the mirror panel 10 is to be less than the thickness of the cement mastic between the edge E and the base B.

The screw threaded plugs 16 are chemically welded to the frame 11 within threaded bores 17 for the purpose later to be explained in detail.

The backing lamina 13 may be utilized to hold mounting elements to the mirror panel. The two leaf springs 18, best shown in Figures 3 and 4, may each be secured to the backing lamina 13 by two rivets R. The two rigid generally S-shaped bracket members 19 may each be secured to the backing lamina 13 by two rivets R. The brackets 19 are adapted to be inserted in bracket engaging members 20 secured to a wall W as best shown in Fig. 4. In mounting the mirror on the wall, the mirror is placed against the wall at a slightly higher elevation than at which it is to be finally mounted, the mirror is pressed against the wall so as to impress the spring members 18, and then the mirror is lowered so that the brackets 19 engage the bracket engaging members 20 as shown in Fig. 4. This spring and bracket mounting has been found in practice to be satisfactory on battleships or other naval craft having guns aboard.

In Figure 4, the attaching members are secured to the backing lamina 13 by rivets, the heads of which, which are adjacent the cement mastic, directly engage the interior surface of the backing panel. When the use of the mirror is such that great strength is to be inherent in the mounting, a metal or plastic plate P may be placed over the interior surface of the backing lamina 13 so that the interior heads H of the rivets may engage same, as shown in the modification of Fig. 5. However, when the backing lamina 13 is of such material which is inherently strong in shear, the plate P may be eliminated and the construction shown in Fig. 4 utilized.

In assembling the mirror shown in Fig. 1, a plastic section corresponding to the channel frame 11 shown in Fig. 2 is extruded into lengths slightly exceeding the perimeter of the mirror. These lengths are then cut into pieces corresponding to the sides, top and bottom of the mirror and mitered as shown in Fig. 1. The top portion 21 and the bottom portion 22 may be drilled and threaded as at 17. The plug 16 may be cut into the proper lengths from a threaded extruded rod fabricated of the same material of which the frame 11 is made.

While the frame pieces and plugs are being made, the glass lamina 12 may be cut to size and mirrored in a conventional manner. The backing lamina 13 may also be cut to size, and the mounting members 18 and 19 riveted thereto as already described. The mirror panel 10 may then be fabricated by applying waterproof and preferably salt waterproof cement mastic which may be organic in nature over either the interior surface of the backing 13 or the exposed surface of the mirror forming film 14 or both. The unframed panel assembly may then be placed in the press which may be a cold or a hot press. If the glass lamina 12 is of the heat treated type, it is preferable that a cold press be used in order not to affect the temper of the glass. Otherwise, a hot press may be used to effect the bonding between the mirrored glass lamina and the backing lamina. It has been found in practice that when the heat treated glass is used in connection with a Masonite backing and a salt waterproof organic mastic cement, a cold press exerting 25 pounds pressure to the square inch effects a satisfactory bond.

The mitered ends M of the frame sides are then chemically treated so that when the ends are pressed tightly together a chemical bond takes place. The frame members are then placed about the formed laminated mirror panel 10 within a jig to hold all the members securely in place. The bonding of the corners of the frame is then effected. Then, under hydraulic pressure, cement mastic is forced through the openings 16 in the top portion 21 and bottom portion 22 of the frame so that cement mastic flows between the edge E and the interior surface of the base B of the frame 11 and between the panel 10 and the interior surfaces of the legs L to form a hermetically sealed edge on the panel 10. It has been found in practice that a gun of the type used to force grease into the bearing elements of the chassis of an automobile is satisfactory for the purpose of forcing the cement mastic between the frame 11 and the panel 10 as described. Because of the relatively large spacing between the edge E and the interior surface B of the channel frame, the cement mastic under pressure first tends to flow about the edge of the panel and second about the space between the panel and inside of the legs L so as to insure a hermetically sealed edge on the completed mirror. When the mastic can be seen by the observer looking at the base of the mirror, then the operator knows that the edge of the mirror is sealed at the corresponding place of observation, so that when the mastic can be seen in the face of and all around the mirror, the mirror is completely sealed. The use of hydraulic pressure serves to effect a neat, even seal. The mirror panel corners C may be rounded as shown in Fig. 1a in order to insure a neat flow about the corners for the mirror panel 10.

Instead of bonding the glass lamina 12 to the backing 13 prior to its insertion in the frame, they may be bonded at the same time that the frame is bonded to the panel 10 by utilizing a jig or other spacing means which will hold the glass lamina 12 and backing 13 in a desired spaced relation while the mastic is forced between the glass and the backing under hydraulic pressure through the bores 17.

After the panel 10 is formed and the frame hermetically sealed thereto, the plugs 16 and the threaded bores 17 are then chemically treated so that when the plugs 16 are inserted into the bores 17 a chemical weld takes place.

Though the frame 11 has been described as being of plastic, it may be fabricated of any material suitable for the purpose intended. For example, the frame may be of metal or wood. The frame may not only be formed by the process of extrusion but it may also be manufactured by other methods such as by compression molding, hand carving or it may be shaped in any suitable manner. When the frame is made of a plastic, the edges which are to be joined may be treated with a plastic solvent so as to effect a chemical weld. When the nature of the plastic permits, heat may be used to effect the weld. With different types of plastics corresponding solvents will be used when a chemical weld is desired. The frame joints may also be made with suitable cements. The plugs 16 may be connected to the bores 17 as described in connection with the frame joints.

Though the drawing shows two bores 17 being utilized in connection with the sealing of the frame 11 to the mirror panel 10, a single bore or more than two bores may be utilized. The bore or bores may be located anywhere along the frame and even at one of the mitered corners as well as centrally at one of the sides of the frame. Though the mirror shown in the drawing is rectangular in shape, it may be of any geometrical shape, either polygonal, circular, elliptical or variations thereof. Though the cement mastic which is applied between the edge E and the inside of the channel frame may be of any color, it is preferable to have this cement mastic in a very dark color or substantially black so that the reflection of the inner side of one of the legs L in the mirror or lack of reflection does not detract from the appearance of the mirror. The frame of the mirror may be of any color which will, of course, be as permanent as the plastic material utilized for the extrusion of the channel frame. It will have the qualities of the plastic and will be sanitary and durable as well as attractive. The construction of the mirror is such that it is inherently shatter-proof and shock-proof and in addition the reflecting qualities of the mirror will be permanent because of the protection afforded the mirror forming film by the construction described.

While the lamina 13 which forms the backing of the panel 10 has been described as a tempered lignin plastic material known to the trade as "Masonite," it also may be made of fiber or laminated plastic resin sheets or wood or any other suitable material. The mastic cement 15 may be of suction type, or a plastic such as poly-vinyl-butyral plastic or other similar plastics. It also may be a synthetic organic rubber bearing salt water proof cement.

While the mastic cement 15 may be the same between the laminae and between the edge E and the inside of the frame, one type of mastic cement or adhesive may be used between the laminae and another type between the edge E and the inside of the frame.

Though the glass lamina may be of ¼" thickness, a glass thickness of ⅛" or less may be used because the construction described is inherently strong and relatively thin, light materials may be used to advantage.

While the plugs 16 have been described as being screw threaded, the plugs need not be threaded and may be either cylindrical or tapered in frustro-conical shape.

Whereas specific wall attaching means has been described in connection with the illustration shown in Figures 3, 4 and 5, other wall attaching means may be utilized without departing from the spirit of the invention. Not only may wall attaching means be associated with the backing 13, the hinges may be secured thereto or to the frame so that the finished hermetically sealed panel may act as a door or cover or lid such as the door to a medicine cabinet, for example. The wall attaching means may also be made integral with one of the plugs 16. The plugs 16 may also be extended so they may act as pivots in fixed supporting sockets so that the mirror can be pivotally mounted.

It will be obvious to those skilled in the art that various changes may be made without departing from the spirit of the invention and therefore the invention is not limited to what is shown in the drawing and described in the specification but only as indicated in the appended claims.

What is claimed is:

1. A plastic framed laminated mirror panel comprising a lamina of mirrored glass, a lamina of salt waterproof organic mastic cement, and a lamina of tempered lignin plastic material, a channel shaped plastic frame extending about the edges of said laminae and a mastic cement between the inside of the channel of said frame and the edges of said laminated panel.

2. The method of fabricating a plastic framed laminated panel comprising shaping a length of channel frame section including a base and two legs, holding a plurality of laminae in spaced relation, with the edges thereof framed by the channel section but in spaced relation thereto, forcing under pressure cement mastic between the inside of the base and the edges of the laminae and the laminae so that the laminae are bonded together and the edges of the bonded laminae are bonded to the frame simultaneously.

3. The method of fabricating a plastic framed laminated panel comprising shaping a length of channel frame section including a base and two legs, cutting said length of said frame section to a plurality of frame members, mitering said frame members, associating said laminae with said frame members in a manner so as to have the edges of the laminae framed by the channel section but held in spaced relation thereto, chemically bonding the mitered edges of said frame members, then forcing under pressure a cement mastic between the inside of said base and the edges of said laminae to form a framed laminated panel having hermetically sealed edges.

4. The method of fabricating a plastic framed laminated panel comprising shaping a length of channel frame section including a base and two legs, cutting the length of frame section into four sides, mitering the ends of said sides, chemically bonding the mitered edges, drilling a hole through one of the frame sides for the entrance of the cement mastic under pressure, holding a plurality of laminae so as to have the edges of the laminae framed by the channel section but in spaced relation thereto, forcing under pressure cement mastic between the inside of said base and the edges of said laminae to form a framed laminated panel having hermetically sealed edges, plugging the hole with a plastic plug after the mastic has been forced therethrough and chemically bonding the plug to the frame.

5. The method of fabricating a plastic framed laminated panel comprising shaping a length of channel frame section including a base and two legs, holding a plurality of spaced laminae so as to have the edges framed by the channel section but in spaced relation thereto, simultaneously bonding said laminae to each other and the frame to the edges of said laminae by forcing under pressure a cement mastic between the laminae and between the edges thereof and the frame.

6. A plastic framed laminated mirror panel comprising a lamina of mirrored glass, a lamina of salt waterproof organic mastic cement, and a lamina of tempered lignin plastic material, a frame extending about the edges of said laminae and a mastic cement between the inside of said frame and the edges of said laminated panel.

7. The structure recited in claim 1, said channel shaped plastic frame having a section comprising a base and two legs, the space between the edges of said laminae and the inside of said base being of greater dimension than the space between the surface of said laminae adjacent the edges thereof and the inside of said legs.

8. A hermetically sealed plastic framed laminated mirror panel comprising a lamina of mirrored glass, a lamina of salt-water proof organic mastic cement, and a lamina of sheeting, a frame extending about the edges of said laminae and overlying the margins of the face of said glass lamina and the margins of the back of said sheeting, and a mastic cement between the inside of said frame and the edges of said laminated panel.

EPHRAIM WINER.